United States Patent
Lewis et al.

(10) Patent No.: US 7,195,273 B2
(45) Date of Patent: Mar. 27, 2007

(54) FLEXIBLE HOUSING FOR AN AIRBAG MODULE

(75) Inventors: Robert E. Lewis, West Haven, UT (US); Trudy C. Lewis, West Haven, UT (US); Gregory J. Lang, South Ogden, UT (US); Larry D. Rose, South Weber, UT (US)

(73) Assignee: Autoliv ASP, Inc., Ogden, UT (US)

( * ) Notice: Subject to any disclaimer, the term of this patent is extended or adjusted under 35 U.S.C. 154(b) by 250 days.

(21) Appl. No.: 10/822,501

(22) Filed: Apr. 12, 2004

(65) Prior Publication Data

US 2005/0225059 A1    Oct. 13, 2005

(51) Int. Cl.
*B60R 21/16* (2006.01)

(52) U.S. Cl. .................................. 280/728.2
(58) Field of Classification Search ............ 280/728.2, 280/731, 743.1
See application file for complete search history.

(56) References Cited

U.S. PATENT DOCUMENTS

| | | | | |
|---|---|---|---|---|
| 5,121,941 A | * | 6/1992 | Mihm et al. ................. | 280/732 |
| 5,172,933 A | * | 12/1992 | Strasser ....................... | 280/740 |
| 5,303,951 A | | 4/1994 | Goestenkors et al. | |
| 5,342,090 A | | 8/1994 | Sobczak et al. | |
| 5,564,739 A | | 10/1996 | Davidson | |
| 5,632,506 A | * | 5/1997 | Shellabarger ............. | 280/743.1 |
| 5,794,967 A | | 8/1998 | Manire | |
| 5,833,266 A | | 11/1998 | Bartoldus et al. | |
| 5,988,677 A | | 11/1999 | Adomeit et al. | |
| 6,152,484 A | | 11/2000 | Fischer et al. | |
| 6,168,185 B1 | | 1/2001 | Ross | |
| 6,299,204 B1 | * | 10/2001 | Keshavaraj .............. | 280/743.1 |
| 6,543,803 B1 | | 4/2003 | Harada et al. | |
| 2003/0209888 A1 | | 11/2003 | Davis, Jr. et al. | |

FOREIGN PATENT DOCUMENTS

| | | | |
|---|---|---|---|
| DE | 19705829 C1 | * | 5/1998 |
| EP | 0 558 271 B1 | | 5/1995 |
| EP | 0861760 A2 | | 9/1998 |
| GB | 2 309 942 A | | 8/1997 |

* cited by examiner

*Primary Examiner*—Faye M. Fleming
(74) *Attorney, Agent, or Firm*—Sally J Brown; Madson & Austin

(57) ABSTRACT

An airbag module may have an inflator, a cushion, and a housing that contains the inflator and the cushion. The housing has an outer wall formed of a flexible material and a bracket designed to be attached to a vehicle. During deployment, the cushion is expelled out of the housing through the bracket. The inflator remains in the housing and inflation gas is conveyed to the cushion through the housing. The inflator may be retained by flaps wrapped around the inflator and secured to a perpendicularly oriented diffuser of the inflator. Alternatively, the diffuser may extend through an orifice formed in a fabric wall within the housing, and retention portions of the outer wall may be wrapped around the opposite side of the inflator. The airbag module may be mounted in an instrument panel to provide front seat, passenger's side impact protection without requiring a rigid module housing.

44 Claims, 5 Drawing Sheets

FLEXIBLE HOUSING FOR AN AIRBAG MODULE

BACKGROUND OF THE INVENTION

The inclusion of inflatable safety restraint devices, or airbags, is now a legal requirement for many new vehicles. Airbags are typically installed in the steering wheel and in the dashboard on the passenger's side of a car. Additionally, airbags may be installed to inflate beside vehicle occupants to provide side impact protection, in front of the knees to protect the knees from impact, or at other strategic locations.

In the event of an accident, a sensor system within the vehicle senses an impact situation and triggers the ignition of an inflator. Inflation gases from the inflator fill the airbag cushions, which immediately inflate to protect the driver and/or passengers from impact against the interior surfaces of the vehicle. During normal vehicle operation, airbags are typically stowed behind covers to protect them from tampering and provide a more attractive interior facade for the vehicle.

Passenger side frontal impact airbags are often installed in the instrument panel of the vehicle. Often, such airbags are installed on an upper surface of the instrument panel. The inflator is installed within the panel and is disposed such that inflation gas flows upward to cause the cushion to expand upward. The folded cushion and the inflator are typically packaged within a housing that keeps the cushion folded and retains the inflator and cushion during deployment. The housing is typically formed of sheet metal or the like.

Unfortunately, the housing adds significantly to the cost of the airbag module. The housing must typically be formed separately from other module components, thereby requiring the use of separate manufacturing steps. Additionally, the inflator and the cushion must be inserted into and attached to the housing with procedures that can be relatively time consuming and labor intensive. The housing also adds weight to the airbag module, thereby adding to the overall weight and fuel consumption of the vehicle. Thus, currently available airbag housing technologies have a number of disadvantages.

BRIEF SUMMARY OF THE INVENTION

The apparatus and method of the present invention have been developed in response to the present state of the art, and in particular, in response to the problems and needs in the art that have not yet been fully solved by currently available airbag modules. Thus, it is an overall objective of the present invention to provide an airbag module and associated methods that remedy the shortcomings of the prior art.

To achieve the foregoing objective, and in accordance with the invention as embodied and broadly described herein in one embodiment, an airbag module includes a cushion, an inflator, and a housing that generally contains the cushion and the inflator. At least part of the housing is formed as a single piece with at least part of the cushion, and is formed of a flexible material such as a fabric. The inflator may be connected to an electronic control unit (ECU) that is further coupled to a collision sensor, such as an accelerometer, so that the ECU is able to transmit an activation signal to the inflator in response to detection of a collision by the collision sensor. The vehicle has a windshield and an instrument panel from which the cushion deploys.

The housing has an outer wall integrated with the cushion, first and second brackets used to attach the housing and the cushion to the instrument panel, and first and second flaps used to retain the inflator. The outer wall has an attachment throat integral with an inlet of the cushion. The attachment throat and the inlet are folded between the brackets to form a pleat. Each of the brackets may have a generally rectangular shape open in the middle so that the cushion is able to exit the housing through the brackets during deployment. The brackets are attached together via rivets or the like to retain the pleat, thereby retaining the attachment throat of the outer wall of the housing and the inlet of the cushion.

The inflator has a main body with an axis and a diffuser that extends generally perpendicular to the axis. The first flap has a tongue and the second flap has a slit through which the tongue is inserted. The inflator is positioned between the two flaps. Each of the flaps has an orifice, and each of the flaps is wrapped about three-quarters of the way around the main body of the inflator to position the orifices near the diffuser. The orifices are inserted over the diffuser so that the diffuser retains the ends of the first and second flaps, thereby keeping the flaps and the inflator in place. The inflator has a recess between the main body and the diffuser. The orifices slide into engagement with the recess, and the relatively larger profile of the diffuser tends to keep the orifices from sliding free of the diffuser. The flaps serve as a barrier that separates the housing into an inflator retention portion and a cushion retention portion.

The cushion may be packed within the housing in a variety of ways, including orderly folding and "chaos," or compression folding, in which no ordered folding pattern is provided. If compression folding is used, the cushion is simply pressed through the brackets and into the housing to rest against flaps. The brackets are attached to the instrument panel in such a manner that the housing extends into the instrument panel. The inflator may be an "adaptive" inflator containing multiple initiators that can be selectively activated to determine the intensity and/or timing of cushion inflation. The inflator may be coupled to the ECU via wires that pass through the housing to reach both ends of the inflator.

When a collision or impending collision is detected, the inflator deploys to produce inflation gas. The inflation gas is released into the cushion retention portion via the diffuser. The inflation gas pushes the cushion out of the housing and inflates the cushion by passing through the attachment throat and the inlet. The outer wall may have one or more vents through which inflation gas is able to exit the cushion and housing at a limited flow rate during deployment. The vents may serve to soften the inflated cushion and permit deflation by releasing gas into the instrument panel. Venting may thus be provided without contact of the inflation gas with vehicle occupants.

According to one alternative embodiment of the invention, the housing has an outer wall that is not formed as a single piece with part of the cushion, but is rather separate from it. The outer wall has an attachment throat and the cushion has an inlet separate from the attachment throat. The attachment throat and the inlet are retained between two brackets like those of the previous embodiment. The inlet may be reinforced by a reinforcement piece.

The inflator may be similar to that of the previous embodiment. However, in place of the flaps of the previous embodiment, the outer wall may have first and second retention portions that cooperate to retain the inflator. Additionally, a wall extends internally between opposing sides of the outer wall to divide the housing into a cushion retention portion and an inflator retention portion. The wall has an orifice through which the diffuser of the inflator extends. The first and second retention portions wrap around the opposite side of the main body of the inflator to keep the main body against the wall. The first and second retention portions overlap each other and have slits that may be aligned with each other by deforming the first and second retention portions, thereby permitting insertion of the inflator into the inflator retention portion.

The cushion may, again, be inserted into the housing via ordered folding and subsequent insertion, by compression folding, or the like. The brackets are again attached to the instrument panel in such a manner that the housing extends into the instrument panel. The inflator may be coupled to the ECU via wires that pass through the slits of the first and second retention portions, or through holes formed in the outer wall, separate from the slits.

The airbag module deploys in response to detection of a collision or an impending collision. The inflator produces inflation gas, which is released into the cushion retention portion through the diffuser. The inflation gas pushes the cushion out of the housing through the brackets and inflates the cushion. The housing may not have vents, although some venting may occur through the orifice and the slits of the first and second retention portions. Vents may optionally be provided to stiffen the inflated cushion or to expedite deflation.

Through the use of airbag modules and associated methods of the present invention, airbag modules may be produced in an efficient and inexpensive manner by elimination of a rigid housing. Such airbag modules may provide rapid and reliable inflation, and may easily permit venting of inflation gas into the instrument panel of a vehicle, thereby avoiding contact of the inflation gas with vehicle occupants. Furthermore, the airbag module may be efficiently and cost-effectively manufactured. These and other features and advantages of the present invention will become more fully apparent from the following description and appended claims, or may be learned by the practice of the invention as set forth hereinafter.

BRIEF DESCRIPTION OF THE SEVERAL VIEWS OF THE DRAWINGS

In order that the manner in which the above-recited and other features and advantages of the invention are obtained will be readily understood, a more particular description of the invention briefly described above will be rendered by reference to specific embodiments thereof which are illustrated in the appended drawings. Understanding that these drawings depict only typical embodiments of the invention and are not therefore to be considered to be limiting of its scope, the invention will be described and explained with additional specificity and detail through the use of the accompanying drawings in which.

DETAILED DESCRIPTION OF THE INVENTION

The presently preferred embodiments of the present invention will be best understood by reference to the drawings, wherein like parts are designated by like numerals throughout. It will be readily understood that the components of the present invention, as generally described and illustrated in the figures herein, could be arranged and designed in a wide variety of different configurations. Thus, the following more detailed description of the embodiments of the apparatus, system, and method of the present invention, as represented in FIGS. 1 through 5, is not intended to limit the scope of the invention, as claimed, but is merely representative of presently preferred embodiments of the invention.

For this application, the phrases "connected to," "coupled to," and "in communication with" refer to any form of interaction between two or more entities, including mechanical, electrical, magnetic, electromagnetic, and thermal interaction. The phrase "attached to" refers to a form of mechanical coupling that restricts relative translation or rotation between the attached objects. The phrases "pivotally attached to" and "slidably attached to" refer to forms of mechanical coupling that permit relative rotation or relative translation, respectively, while restricting other relative motion.

The phrase "attached directly to" refers to a form of attachment by which the attached items are either in direct contact, or are only separated by a single fastener, adhesive, chemical bond, or other attachment mechanism. The term "abutting" refers to items that are in direct physical contact with each other, although the items may not be attached together. The term "grip" refers to items that are in direct physical contact with each other, wherein one item holds the other firmly. The terms "integrally formed" refer to a body that is manufactured integrally, i.e., as a single piece, without requiring the assembly of multiple pieces. Multiple parts may be integrally formed with each other if they are formed from a single workpiece. Items that are "coupled to" each other may be formed as a single piece with each other.

Figure 1:
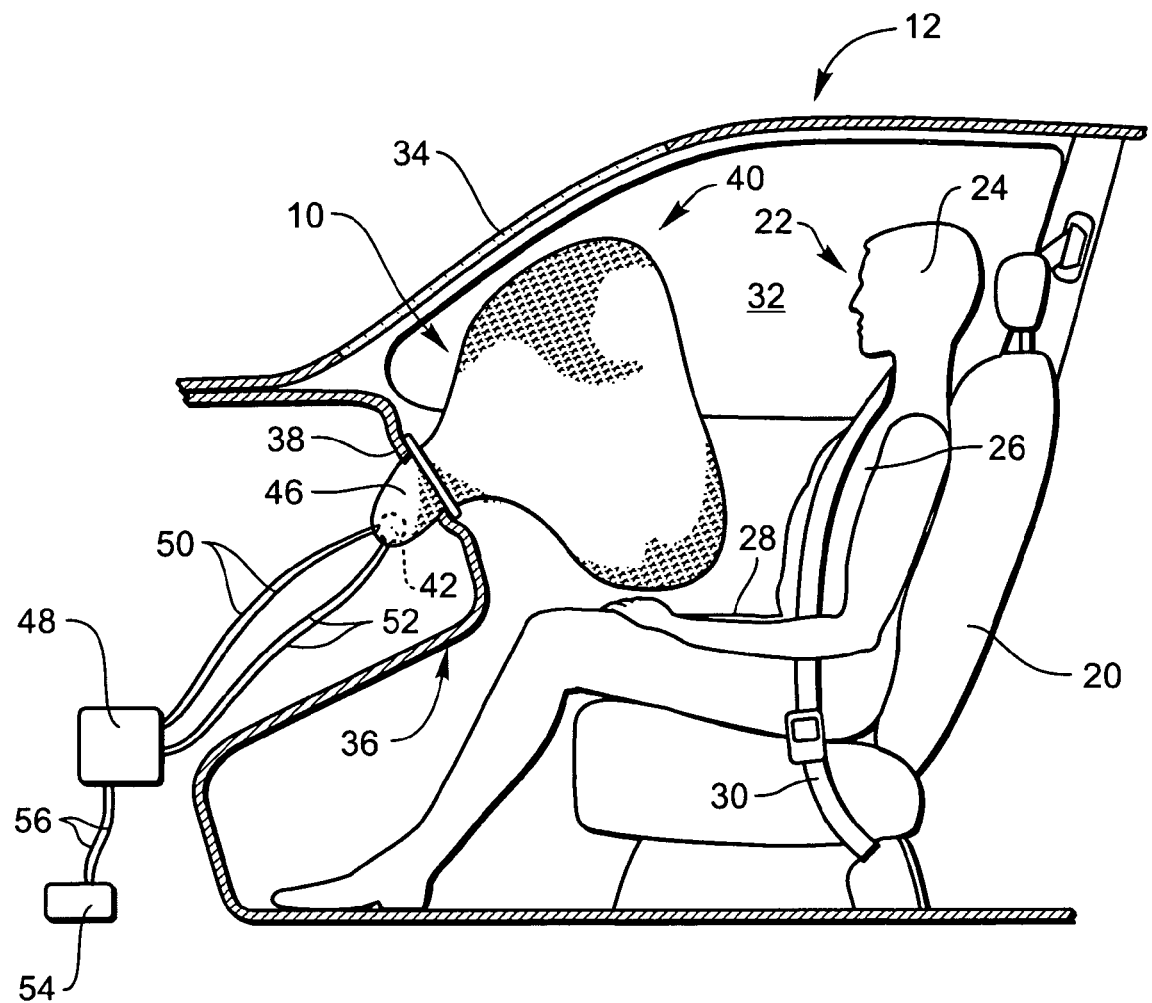
FIG. 1 is a side elevation view of an airbag module according to one embodiment of the invention, mounted as a passenger side, frontal impact airbag within the instrument panel of a sectioned vehicle, with the cushion in the inflated configuration.

Referring to FIG. 1, a side elevation view shows an airbag module 10 according to one embodiment of the invention. The airbag module 10 is designed to provide passenger's side, frontal impact protection. However, those of skill in the art will recognize that the present invention is equally applicable to other types of airbags, such as knee bolsters, overhead airbags, inflatable curtains, side airbags, inflatable structural stiffeners, and the like.

As illustrated, the vehicle 12 has a seat 20 in which an occupant 22 is seated. The occupant 22 has a head 24, a torso 26, and a lap 28. A seat belt 30 provides primary restraint for the occupant 22. The vehicle 12 also has a front door 32 beside the occupant 22, a windshield 34 forward of the occupant 22, and an instrument panel 36 disposed generally underneath the windshield 24. The airbag module 10 is stowed within the instrument panel 36 and is seated in a mounting recess 38 of the instrument panel 36. A decorative trim panel (not shown) or the like may be positioned over the mounting recess 38 to hide the airbag module 10 from the occupant 22.

As shown, the airbag module 10 has a cushion 40, which is illustrated in fully inflated form. The airbag module 10 also has an inflator 42 positioned within the instrument panel 36 to provide inflation gas to the cushion 40. The inflator 42 may be of any known type, including compressed gas, pyrotechnic, and hybrid inflators. The cushion 40 has an inflated configuration, as shown in FIG. 1, and a compacted configuration, in which the cushion 40 is stowed within the instrument panel 36 prior to deployment.

The airbag module 10 includes a housing 46 disposed within the instrument panel 36 to contain the inflator 42 and the cushion 40 in the compacted configuration. The cushion 40 is attached to the housing 46 in such a manner that inflation gas from the inflator 42 is directed through the housing 46 to reach the cushion 40. The cushion 40 may optionally have a vent (not shown) formed therein to release inflation gas into the passenger compartment. However, in the embodiment of FIG. 1, venting may instead be carried out by the housing 46, in a manner that will be shown and described subsequently. At least a portion of the housing 46 is formed of a flexible material, as will also be shown and described subsequently.

In this application, a "flexible material" is any material that is not sufficiently stiff to retain a persistent shape. Accordingly, fabrics, thin plastic sheets, and the like are "flexible materials." Sheet metal, thicker plastic shapes, and the like are typically rigid enough to maintain a persistent shape, and therefore are not flexible materials. The phrase "formed substantially of a flexible material" means that the majority of the outwardly exposed surfaces of a component are formed of the flexible material. Such a component may still include rigid components, but they cannot make up the majority of the outwardly exposed surfaces of the component.

An electronic control unit 48, or ECU 48, is disposed within the vehicle 12. The ECU 48 need not be located as shown, but may be disposed at a variety of locations within the vehicle 12. The ECU 48 may be coupled to the inflator 42 via two sets of wires 50, 52. A collision sensor such as an accelerometer 54 or the like is coupled to the ECU 48 via wires 56. The accelerometer 54 transmits a signal to the ECU 48 to indicate that a collision is occurring or is about to occur. The ECU 48 then transmits an activation signal to the inflator 42 to trigger deployment of the inflator 42. The inflator 42 then releases inflation gas to inflate the cushion 40.

If desired, the inflator 42 may be an "adaptive" inflator designed to provide a variable quantity of inflation gas, based on the severity of impact. The inflator 42 may thus have two initiators (not shown) that can be independently activated. Each initiator provides a quantity of inflation gas, and each may be activated alone for a lower inflation gas output, or both may be activated to provide high inflation gas output. Each set of wires 50, 52 may be coupled to one of the initiators. The ECU 48 may be configured to determine the severity of the collision or impending collision, and thereby to determine which of the sets of wires 50, 52 should receive an activation signal.

Figure 2:
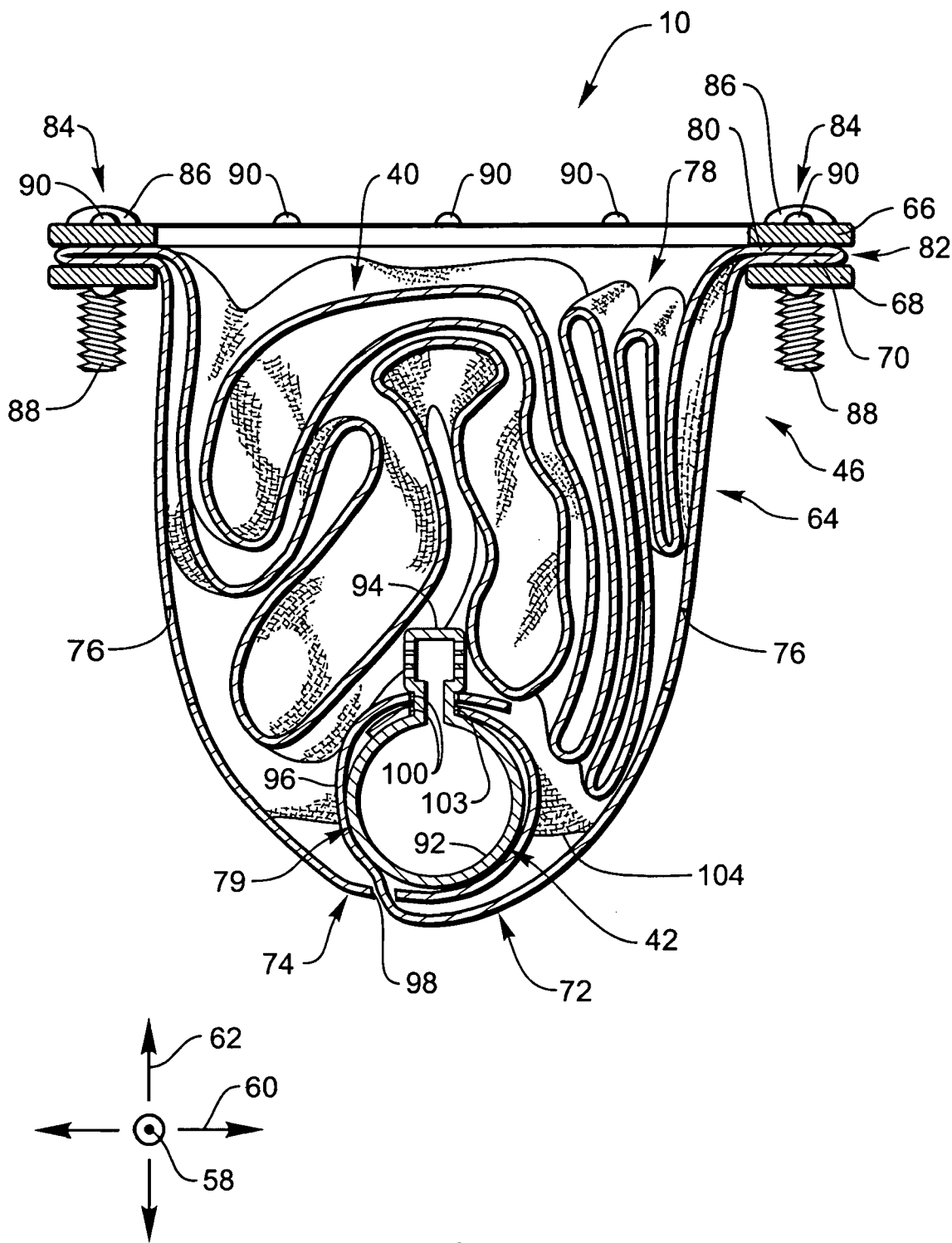
FIG. 2 is an enlarged, side elevation section view of the airbag module of FIG. 1, with the cushion in the compacted configuration.

Referring to FIG. 2, a side elevation, section view illustrates the airbag module 10 in isolation, with the cushion 40 in the compacted configuration within the housing 46. The airbag module 10 has a longitudinal direction 58, a lateral direction 60, and a transverse direction, as indicated by the arrows. In FIG. 2, the cushion 40, inflator 42, and housing 46 described previously are illustrated in greater detail.

The housing 46 includes an outer wall 64, at least a portion of which is formed as a single piece with a portion of the cushion 40. The outer wall 64 is thus formed of the same material as the cushion 40, which may be a standard airbag-grade fabric such as a nylon weave. Additionally, the housing 46 includes a first bracket 66 and a second bracket 68 that are used to attach the outer wall 64 to the mounting recess 38 of the instrument panel 36. Each of the brackets 66, 68 has a generally rectangular shape that is open in the middle, like that of a license plate holder. In FIG. 2, the brackets 66, 68 are viewed from along their longer dimension; their shape will be more clearly illustrated in connection with FIG. 3. The outer wall 64 has an attachment throat 70 captured between the brackets 66, 68.

The housing 46 also includes a barrier that generally separates the inflator 42 from the cushion 40. In the embodiment of FIG. 2, the barrier is provided by a first flap 72 and a second flap 74, which extend from and are formed as a single piece with the outer wall 64. The first and second flaps 72, 74 are wrapped around the inflator 42 to retain the inflator 42 in a manner that will be explained in greater detail subsequently.

The outer wall 64 may have one or more vents 76 that permit the passage of inflation gas through the outer wall 64 at a limited flow rate. Thus, vents need not be provided in the cushion 40. The vents 76 permit inflation gas to vent directly into the instrument panel 36, thereby avoiding direct contact of the inflation gas with vehicle occupants. In the embodiment of FIG. 2, the vents 76 are simply openings. However, in alternative embodiments, tear-away membranes or the like could be used to delay venting until a threshold pressure differential is reached. Alternatively, pyrotechnics or other devices may be attached to the outer wall 64 and electrically coupled to the ECU 48 to enable the creation of a venting orifice during inflation, at a time selected by the ECU 48 to tailor venting to the severity of the impact.

As shown, the flaps 72, 74 separate the space within the outer wall 64 into a cushion retention portion 78 and an inflator retention portion 79. The inflator 42 is positioned generally within the inflator retention portion 79 and the cushion 40, in the compacted configuration, is disposed within the cushion retention portion 78. The inflator retention portion 79 contains the inflator 42, but does not necessarily fully enclose it. Rather, some portion of the inflator 42 may be exposed. In this application, "containing" the inflator 42 refers to the fact that a majority of the inflator 42 is positioned within the envelope defined by the housing 46. In this application, the term "barrier" broadly refers to any structure that generally separates an inflator from a cushion. In FIG. 2, the flaps 72, 74 form a barrier, but as will be shown and described in connection with FIGS. 4 and 5, a barrier may be provided by a variety of other structures.

Returning to the description of FIG. 2, the cushion 40 has an inlet 80 that is positioned adjacent to the attachment throat 70 of the outer wall 64 such that inflation gas flows through the attachment throat 70 and then through the inlet 80 to inflate the cushion 40. The attachment throat 70 and the inlet 80 are formed as a single piece with each other, and cooperate to form a pleat 82 extending outward, between the first and second brackets 66, 68.

A plurality of fasteners 84 extend through holes (not shown in FIG. 2) in the first and second brackets 66, 68 and through corresponding holes (not shown in FIG. 2) in the pleat 82. The fasteners 84 may take the form of rivets, nuts, bolts, or the like. In the embodiment of FIG. 2, the fasteners 84 are PIM fasteners. Consequently, each of the fasteners 84 may have a head 86 with a splined shape (not shown) that mates with a corresponding feature (not shown) of the upper surface of the first bracket 66. When the heads 86 have been pressed into engagement with the first bracket 66, the splines and corresponding features provide an interference fit that prevents relative translation or rotation between the fasteners 84 and the first bracket 66.

Each of the fasteners 84 also has a threaded stud 88 that extends through the first and second brackets 66, 68. The threaded studs 88 may be inserted through aligned openings (not shown) in the mounting recess 38 of FIG. 1, and a nut (not shown) may be threaded into engagement with each of the threaded studs 88 to keep the brackets 66, 68 firmly attached to the mounting recess 38. Prior to installation in the vehicle 12, the first and second brackets 66, 68 are held together via a plurality of additional fasteners, such as rivets 90, which are distributed about the perimeter of the brackets 66, 68 and extend through holes (not shown) formed in the brackets 66, 68 and in the pleat 82.

As shown, the inflator 42 has a main body 92 that extends generally along the longitudinal direction 58. The inflator 42 also has a diffuser 94 that extends from the main body 92, generally along the transverse direction 62. Inflation gas produced within or released from the main body 92 flows through the diffuser 94, which is perforated to cause gas to flow radially outward from the diffuser 94, within the plane defined by the longitudinal and lateral directions 58, 60. As mentioned previously, the inflator 42 may be an adaptive inflator, and may thus have an initiator at each longitudinal end. Additionally, pyrotechnic materials, containers, internal diffusers, and other components may be present within the inflator 42. The configuration of such components is not critical to the invention, and therefore, such components have been omitted from the inflator 42 of FIG. 2.

The first flap 72 has a tongue 96 somewhat narrower than the remainder of the first flap 72. The second flap 74 has a slit 98 oriented along the longitudinal direction 58. The first flap 72 passes outside the second flap 174 until the first flap 72 reaches the slit 98. The tongue 96 then passes through the slit 98 so that most of the tongue 96 passes inside the second flap 74. Each of the flaps 72, 74 is wrapped about three-quarters of the way around the main body 92 of the inflator 42. As used in this application, the term "wrap" does not require full encirclement, and does not require direct contact between an object and the covering that is wrapped around it. Rather, the term "wrap" refers to a covering that encircles at least some sectorial portion of an object.

The first flap 72 has an orifice 100 positioned proximate its distal end, and the second flap 74 has an orifice 100 positioned proximate its distal end. The diffuser 94 protrudes through the orifices 100, 100 to reach the cushion retention portion 78 of the housing 46. Thus, the inflation gas released by the diffuser 94 passes through the flaps 72, 74 (via the orifices 100) and into the cushion retention portion 78. The engagement of the orifices 100 with the diffuser 94 also keeps the flaps 72 in place around the main body 92 of the inflator 42.

The inflator 42 has a recess 103 between the diffuser 94 and the main body 92. The recess 103 has a cross sectional size smaller than that of the diffuser 94. The orifices 100 may be sized to provide a slight interference fit with respect to the diffuser 94. The diffuser 94 may thus be pressed through the orifices 100 with some degree of force so that the orifices 100 are not accidentally drawn back over the diffuser 94 as further assembly steps are carried out.

The outer wall 64 may have longitudinal edges 104 located at the longitudinal extents of the outer wall 64. The longitudinal edges 104 may be positioned to leave a portion of each end of the inflator 42 exposed to permit attachment of the wires 50, 52 (shown in FIG. 1) to the inflator 42 via their associated connectors (not shown).

FIG. 2 illustrates the airbag module 10 after assembly has been completed. The inflator 42 is shown installed in the inflator retention portion 79, and the cushion 40 is shown in the compacted configuration, stowed within the cushion retention portion 78. As shown, the cushion 40 has been compacted via chaos, or compression folding. No ordered folding is present; rather, the cushion 40 has simply been pressed into the cushion retention portion 78. As a result, the relatively random folding shown in FIG. 2 is present.

The depiction of the cushion 40 in FIG. 2 is merely an example; the actual cushion 40 may have more folds and may be more tightly pressed than that shown in FIG. 2. The cushion 40 may be compacted tightly enough to remain securely compacted during assembly and vehicle operation. Tight compaction of the cushion 40 may cause the outer wall 64 to be suspended somewhat stiffly from the brackets 66, 68 when the airbag module 10 is installed in the vehicle 12.

Figure 3:
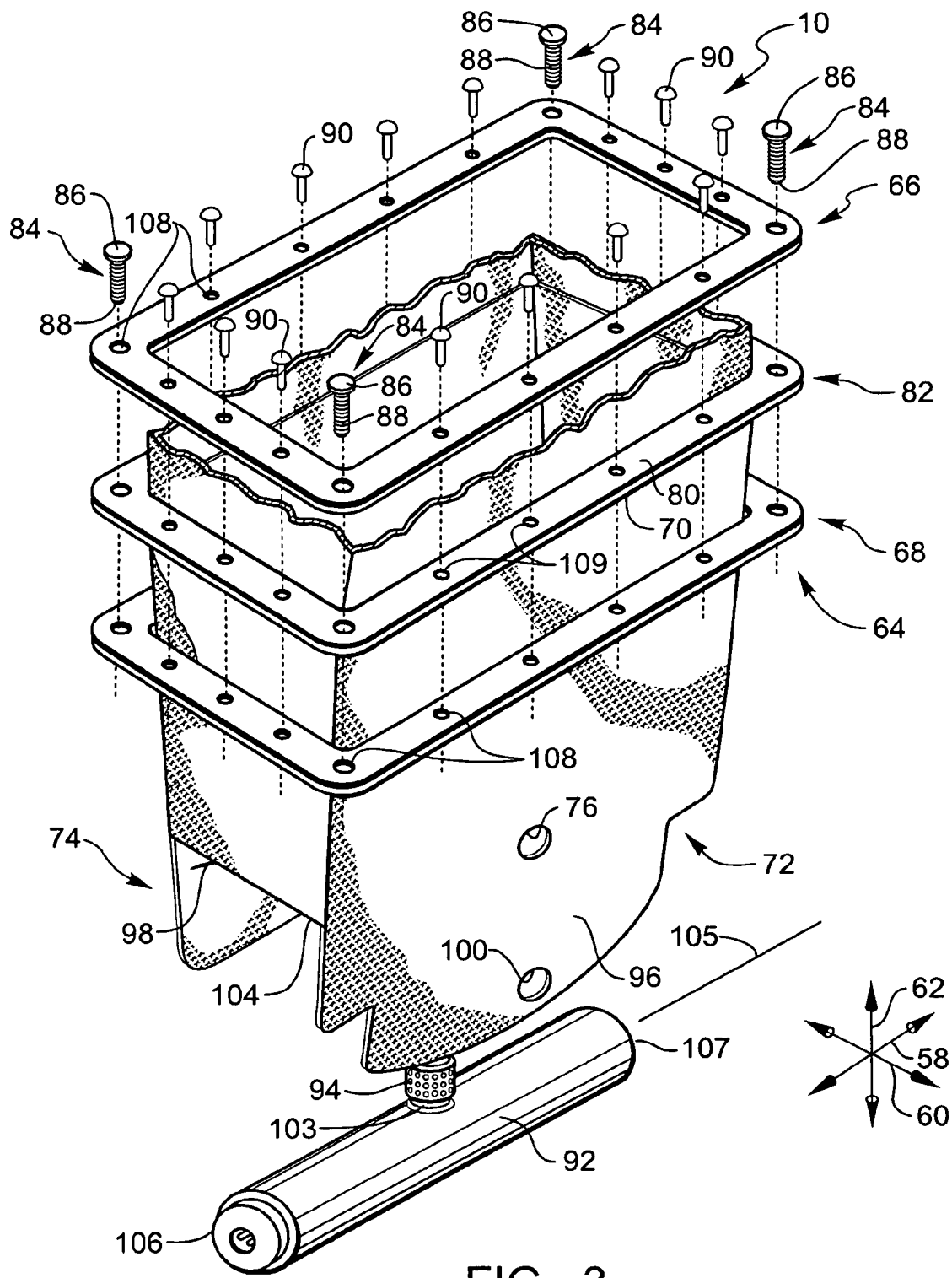
FIG. 3 is an exploded, perspective view of the airbag module of FIG. 1, with all but the inlet of the cushion removed for clarity.

Referring to FIG. 3, an exploded, perspective view illustrates the airbag module 10 of FIGS. 1 and 2. Most of the cushion 40 has been cut away for clarity. As shown, the inflator 42 has an axis 105 parallel to the main body 92. The axis 105 is also the axis of the main body 92. The main body 92 has a first end 106 and a second end 107 opposite the first end. Each of the first and second ends 106, 107 may be shaped to facilitate attachment of an electrical connector (not shown) to a corresponding initiator.

In FIG. 3, the shapes of the first and second brackets 66, 68 are more clearly visible. As illustrated, each of the brackets 66, 68 has a plurality of attachment features in the form of holes 108 distributed about its periphery. One of the holes 108 is positioned at each corner of the brackets 66, 68 to receive the threaded stud 88 of the corresponding fastener 84. The remaining holes 108 receive the rivets 90. The pleat 82 has holes 109 aligned with the holes 108 so that the fasteners 84 can pass through the holes 109 and the holes 108 to retain the pleat 82 securely between the brackets 66, 68.

Use of the fasteners 84 is merely exemplary. In other embodiments, brackets may have attachment features in the form of integrated studs, threaded holes, snap-in features, and the like. Accordingly, in this application, the phrase "attachment feature" is not limited to a hole capable of cooperating with a fastener 84, but rather includes any feature by which a bracket may be attached to a vehicle.

The airbag module 10 may be manufactured and assembled according to a wide variety of methods. The inflator 42, fasteners 84, and rivets 90 may be manufactured through the use of known manufacturing techniques or selected from available off-the-shelf components. The brackets 66, 68 may be stamped, and the holes 108 may be formed as part of the stamping process. The cushion 40, the outer wall 64, and the flaps 72, 74 may be laser cut from one or more pieces of fabric. The vents 76 and holes 109 may be formed as part of the laser cutting process. As mentioned previously, the attachment throat 70 and the inlet 80 are formed from the same piece of material, and at least part of the outer wall 64 may be formed from the same piece of material as the flaps 72, 74. However, other pieces of material may be cut to size and attached together to form the full, three-dimensional structures of the cushion 40 and the outer wall 64.

According to one method of assembly, the attachment throat 70 of the outer wall 64 of the housing 46 and the inlet 80 of the cushion 40 are first folded together to form the pleat 82. The first and second brackets 66, 68 are then positioned to abut the inlet 80 and the attachment throat 70, respectively, and the fasteners 84 are inserted through the holes 108 of the brackets 66, 68 and the holes 109 of the pleat 82. The heads 86 of the fasteners 84 may then be pressed against the adjacent surface of the first bracket 66 to seat them in place, thereby restricting further relative motion between the heads 86 and the first bracket 66.

The rivets 90 may then be installed through the use of known riveting equipment. A nut (not shown) may optionally be threaded onto each of the threaded studs 88 prior to installation of the rivets 90 to keep the brackets 66, 68 at the proper spacing while the rivets 90 are installed.

The inflator 42 is then installed in the housing 46. More precisely, the inflator 42 is inserted between the first and second flaps 72, 74 and the tongue 96 of the first flap 72 is inserted through the slit 98 of the second flap 74. The flaps 72, 74 are wrapped around the main body 92 such that the orifices 100 are aligned with the diffuser 94. The orifices 100 are then pressed over the diffuser 94 so that they engage the recess 103.

After the inflator 42 has been installed, the cushion 40 is compacted and installed. If the compaction method is compression folding, as illustrated in FIG. 2, compaction and installation of the cushion 40 in the housing 46 may be simultaneously be performed by pressing the cushion 40 into the housing 46 through the brackets 66, 68. Otherwise, ordered folding of the cushion 40 may first be performed, and then the compacted cushion 40 may be inserted into the housing 46 through the brackets 66, 68.

The airbag module 10 is then fully assembled and ready for installation in the vehicle 12 (shown in FIG. 1). The wires 50, 52 are coupled to the first and second ends 106, 107, respectively, via attaching connectors (not shown) coupled to each pair of wires 50, 52 to each of the ends 106, 107. When the wires 50, 52 have been attached, the housing 46 may be inserted into the mounting recess 38 of the instrument panel 36, and the threaded studs 88 may be attached to the mounting recess 38 via nuts (not shown) as set forth in the description of FIG. 2. The brackets 66, 68 are then attached to the mounting recess 38, and the housing 46 is generally suspended within the instrument panel 36. A decorative trim panel (not shown) or the like may then be attached to the instrument panel 36 to cover the mounting recess 38 and the airbag module 10 until deployment.

Figure 4:
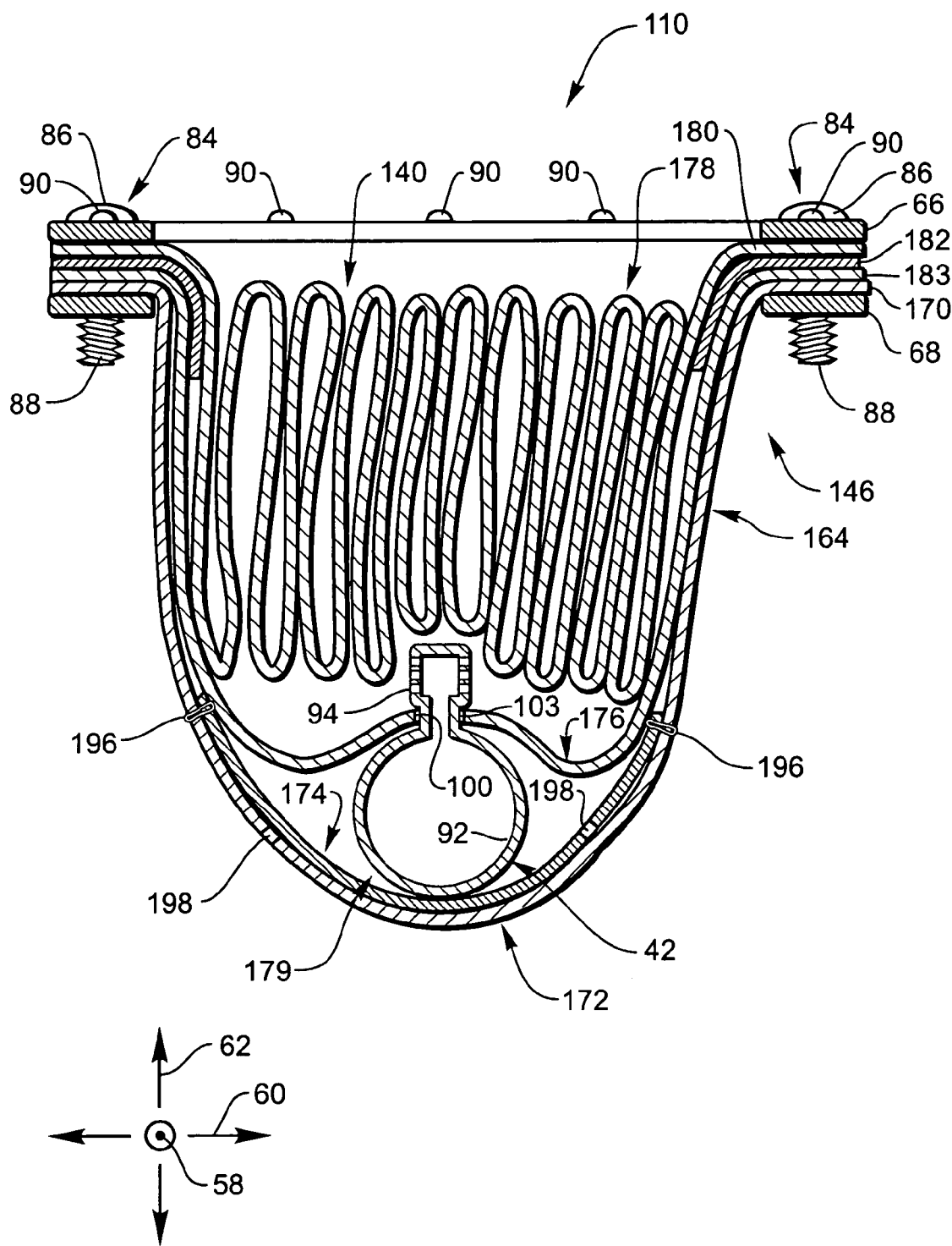
FIG. 4 is a side elevation, section view of an airbag module according to one alternative embodiment of the invention, with the cushion in the compacted configuration.

Referring to FIG. 4, a side elevation, section view illustrates an airbag module 110 according to another alternative embodiment of the invention. As shown, the airbag module 110 has a cushion 140, an inflator 42 like that of the previous embodiment, and a housing 146 that contains the cushion 140 and the inflator 42. At least a portion of the housing 146 is formed of a flexible material such as a fabric.

The housing 146 has an outer wall 164 formed of the flexible material. The outer wall 164 has an attachment throat 170 that is captured between first and second brackets 66, 68 like those of the previous embodiment. In place of the flaps 72, 74 of the previous embodiment, the outer wall 164 includes a first retention portion 172 and a second retention portion 174 that cooperate to wrap around the inflator 42, thereby retaining the inflator 42 in a manner that will be described in greater detail subsequently.

The housing 146 also includes a barrier, in the form of a wall 176 formed of a flexible material, to separate the housing 146 into a cushion retention portion 178 and an inflator retention portion 179. The wall 176 extends from one side of the outer wall 164 to the opposite side of the outer wall 164. The wall 164 may be formed of a fabric such as the fabric of which the outer wall 164 is made.

The cushion 140 has an inlet 180 through which inflation gas enters the cushion 140. A reinforcement piece 182 is also shown attached to the inlet 180 to absorb some of the stresses that act upon the inlet 180 during inflation of the cushion 140. The inlet 180 and the reinforcement piece 182 are sandwiched between the brackets 66, 68 along with the attachment throat 170 of the outer wall 164 of the housing 146. Additionally, the wall 176 has an attachment throat 183 that is also sandwiched between the brackets 66, 68, along with the inlet 180, the reinforcement piece 182, and the attachment throat 170. The attachment throat 183 extends around the full periphery of the brackets 66, 68, and not only along the two sides visible in FIG. 4. The brackets 66, 68 are held together via fasteners 84 and rivets 90, like those of the previous embodiment.

In the embodiment of FIG. 4, the first retention portion 172 is integrally formed with the remainder of the outer wall 164 and extends around the side of the inflator 42 opposite the diffuser 94. The second retention portion 174 is attached to the interior of the first retention portion 172 via stitching 196 to provide a second layer of flexible material that retains the inflator 42.

Each of the retention portions 172, 174 has a slit 198 extending generally along the longitudinal direction 58. The material of the retention portions 172, 174 may be deformed to open the slits 198 and to bring the slits 198 into alignment with each other, to a degree sufficient to permit insertion of the inflator 42 into the inflator retention portion 179. Once the inflator is in place, the retention portions 172, 174 naturally return to a less deformed state, such as that illustrated in FIG. 4, in which the slits 198 are not aligned with each other and the inflator 42 is unable to exit the inflator retention portion 179.

The wall 176 has a first orifice 100 sized to receive the diffuser 94, in a manner similar to that of the orifices 100 of the previous embodiment. The diffuser 94 extends through the first orifice 100 of the wall 176 to reach the cushion retention portion 178 so that inflation gas expelled from the diffuser 94 will be expelled directly into the cushion retention portion 178. As in the previous embodiment, the first orifice 100 is sized to resist removal from the diffuser 94.

The airbag module 110 may be manufactured, assembled and installed in a manner similar to that of the previous embodiment. More precisely, the inflator 42, fasteners 84, and rivets 90 may again be formed through the use of known methods or selected from available off-the-shelf components. The brackets 66, 68 may be stamped, and the cushion 140, outer wall 164 (including the retention portions 172, 174), and the wall 176 may be laser cut from pieces of fabric. Various pieces of fabric may be sewn together to form the full three dimensional shapes of the cushion 140, the outer wall 164, and the wall 176.

The inlet 180, reinforcement piece 182, attachment throat 183, and the attachment throat 170 may then be sandwiched between the brackets 66, 68 in the manner shown. The fasteners 84 may be inserted through the holes 108 of the brackets 66, 68 and through corresponding holes (not shown) of the inlet 180, reinforcement piece 182, the attachment throat 183, and attachment throat 170. The rivets 90 may then be installed through the holes 108 of the brackets 66, 68 and through the corresponding holes of the inlet 180, reinforcement piece 182, the attachment throat 183, and attachment throat 170.

The first and second retention portions 172, 174 are then deformed to align the slits 198 with each other, and the inflator 42 is inserted through the slits 198. The diffuser 94 is inserted through the first orifice 100 such that the first orifice 100 engages the recess 103 of the inflator 42. The retention portions 172, 174 are then permitted to return to less deflected conditions to move the slits 198 out of alignment with each other, thereby keeping the inflator 42 within the inflator retention portion 179.

The cushion 140 is then compacted. As shown in FIG. 4, the cushion 140 may be compacted via an orderly folding pattern. However, the cushion 140 may alternatively be compacted via compression folding, as in the previous embodiment. The cushion 140 may be folded via a folding machine to provide the desired fold pattern, and the compacted cushion 140 may then be inserted into the housing 146 through the brackets 66, 68.

The airbag module 110 may then be installed in a vehicle in a manner similar to that of the previous embodiment. Electrical wiring, such as the wires 50, 52 of FIG. 1, may first be inserted through the slits 198 or through different holes (not shown) formed in the outer wall 164 and coupled to the ends of the inflator 42. The housing 146 may then be seated in a mounting recess of an instrument panel such as the instrument panel 36. The brackets 66, 68 may be attached to the mounting recess via threadable coupling of nuts (not shown) with the threaded studs 88. A decorative trim panel or the like may be attached to cover the mounting recess and the airbag module 110 until deployment.

Figure 5:
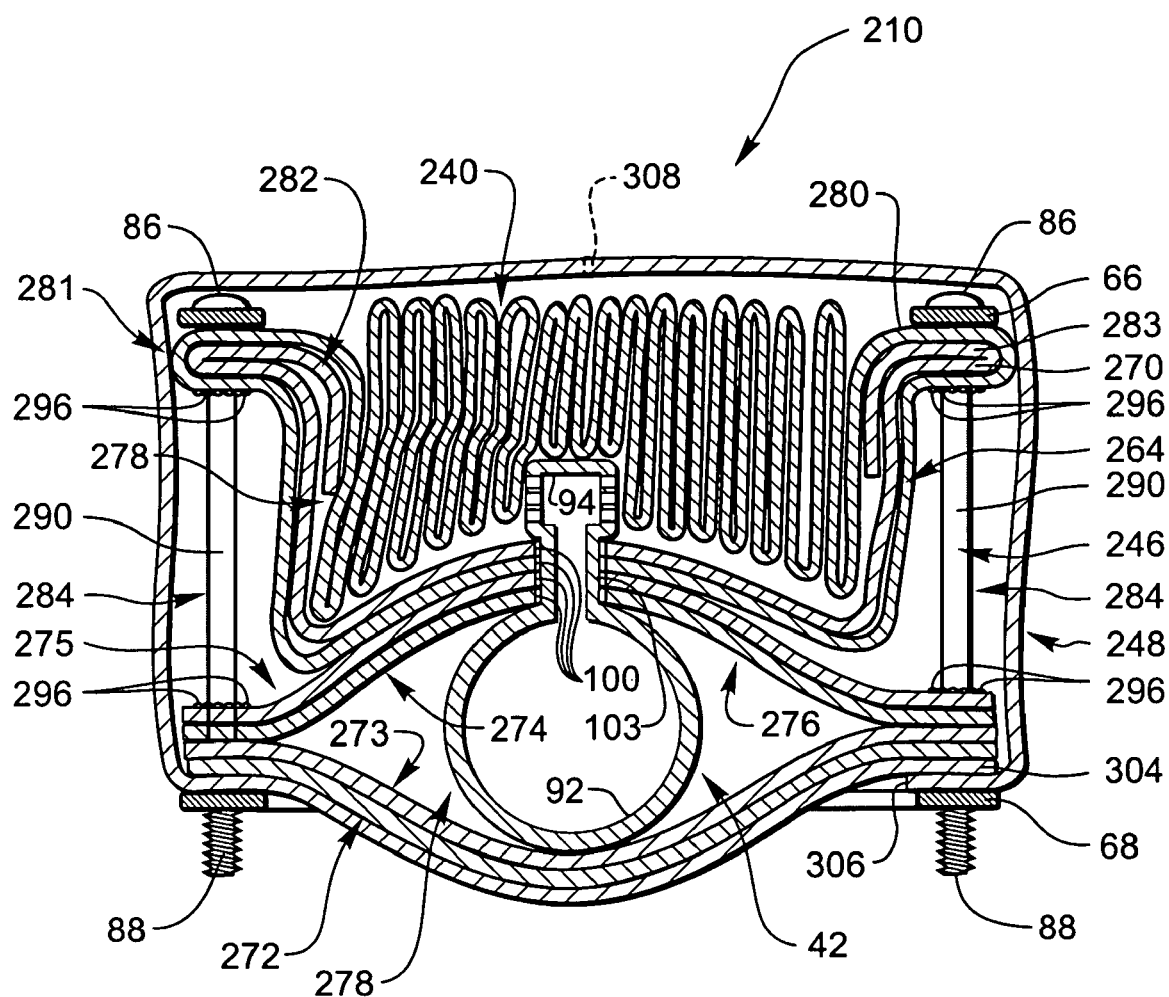
FIG. 5 is a side elevation, section view of an airbag module according to another alternative embodiment of the invention, with the cushion in the compacted configuration.
Figure 5:
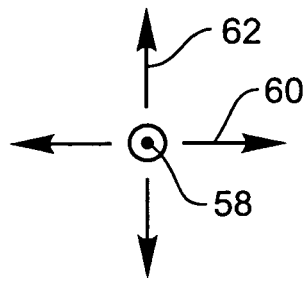

Referring to FIG. 5, a side elevation, section view illustrates an airbag module 210 according to another alternative embodiment of the invention. As shown, the airbag module 210 has a cushion 240 that is also designed to provide impact protection for a front seat, passenger's side vehicle occupant. The airbag module 210 also includes an inflator 42 like those of the previous two embodiments, and a housing 246 that contains the airbag module 210 and the inflator 42. The airbag module 210 may also have a cover 248 that wraps around the housing 246 to keep the cushion 240 in place until deployment.

As shown, the housing 246 has an outer wall 264 that generally contains the cushion 240 in the compacted configuration. The housing 246 also has a first bracket 66 and a second bracket 68 like those of the previous embodiments. The outer wall 264 has an attachment throat 270 retained between the brackets 66, 68. The housing 246 also has a first reinforcement panel 272 and a second reinforcement panel 273 that are attached to the cover 248 and are positioned on the opposite side of the inflator 42 from the outer wall 264. Furthermore, the housing 246 includes a first barrier panel 274 and a second barrier panel 275 that are positioned adjacent to a corresponding portion of the outer wall 264 and on the opposite side of the inflator 42 from the reinforcement panels 272, 273.

The barrier panels 274, 275 cooperate to form a barrier 276. The barrier 276 separates the housing 246 into a cushion retention portion 278 and an inflator retention portion 279. In the embodiment of FIG. 5, the cushion retention portion 278 is defined by the outer wall 264, and the inflator retention portion 279 is positioned between the reinforcement panels 272, 273 and the barrier 276.

As shown, the cushion 240 has an inlet 280 through which inflation gas enters the cushion 240 to inflate the cushion 240. The inlet 280 is formed as a single piece with the attachment throat 270. The inlet 280 and the attachment throat 270 are folded to form a pleat 281. The cushion 240 also has a reinforcement piece 282 attached to the inlet 280 to absorb some of the stresses that act upon the inlet 280 during inflation of the cushion 240. A portion of the reinforcement piece 282 is folded into the pleat 281, between the inlet 280 and the attachment throat 270.

The airbag module 210 also includes fasteners 284, which are somewhat similar to the fasteners 84 of the previous two embodiments. The fasteners 284 may also be PIM fasteners, but may be elongated to better suit the configuration of the airbag module 210. Each of the fasteners 284 has a head 86 and a threaded stud 88, like those of the previous embodiments. However, each of the fasteners 284 also has a shaft 290 that separates the head 86 from the threaded stud 88. The shaft 290 may or may not be threaded, and is shown without threads in FIG. 5. As in the previous embodiments, the heads 86 may be pressed into engagement with the first bracket 66 to prevent relative motion between the heads 86 and the first bracket 66.

The fasteners 284 are inserted through holes (not shown) in the pleat 281, the reinforcement panels 272, 273, the barrier 276, and the adjoining portion of the cover 248 so that the pleat 281, the reinforcement panels 272, 273, the barrier 276, and the adjoining portion of the cover 248 are all captured between the brackets 66, 68. If desired, intermediate fasteners (not shown) such as rivets or the like may be spaced between the fasteners 284 and used to provide supplemental attachment of the brackets 66, 68.

Various portions of the housing 246 are attached together via stitching 296. More precisely, the first and second reinforcement panels 272, 273, the first and second barrier panels 274, 275, and the adjoining portion of the cover 248 are attached together via stitching 296 positioned proximate the corresponding holes through which the fasteners 284 are inserted. Additionally, the pleats 281 (i.e., the attachment throat 270, the inlet 280, and the reinforcement piece 282) are also attached together via stitching 296 positioned proximate the corresponding holes through which the fasteners 284 are inserted. The stitching 296 may be used to attach various parts of the airbag module 210 together prior to final assembly.

Each of the first and second barrier panels 274, 275, the cushion 240, and the reinforcement piece 282 has an orifice 100 sized similarly to the orifices 100 of the previous embodiments. Thus, the diffuser 94 is insertable through the orifices 100 so that the diffuser 94 is disposed within the cushion retention portion 278 of the housing 246. The orifices 100 engage the recess 103 of the inflator 42 such that they are not accidentally withdrawn back over the diffuser 94.

As mentioned previously, the cover 248 is wrapped around the housing 246 to keep the cushion 240 in place until deployment occurs. The cover 248 may have a first end 304 and a second end 306. The first end 304 is adjacent to the first reinforcement panel 272, and the adjoining portion of the cover 248 extends along the first reinforcement panel. The fasteners 84 extend through holes (not shown) in the first end 304 and the adjoining portion. When the cover 248 is wrapped around the housing 246, the second end 306 is adjacent to the first end 304, and the fasteners 84 that extend through the first end 304 also extend through aligned holes (not shown) formed in the second end 306. Accordingly, the cover 248 is securely retained by the fasteners 284.

The cover 248 has a plurality of perforations 308 positioned generally over the central portion of the cushion 240. The perforations 308 may extend in a generally straight line along the longitudinal direction, or along any other desired path. When the inflator 42 begins producing inflation gas, the inflation gas exits the inflator 42 through the diffuser 94 and begins to inflate the cushion 240. The cushion 240 presses against the cover 248 and causes the cover 248 to rupture along the perforations 308. The cover 248 is thus split into two pieces that withdraw to either side of the housing 246 to permit the cushion 240 to inflate through the first bracket 66.

The airbag module 210 may be manufactured and assembled according to a variety of methods. As in previous embodiments, the inflator 42 and the fasteners 284 may be manufactured according to known embodiments or selected from components available off-the-shelf. The brackets 66, 68 may be stamped, and the cushion 240, outer wall 264 reinforcement panels 272, 273, barrier panels 274, 275, and cover 248 may be laser cut from pieces of fabric. Various pieces of fabric may be sewn together to form the full three dimensional shapes of the cushion 240, the outer wall 264, and the barrier 276. The reinforcement panels 272, 273 and the cover 248 may also be sewn together, if desired.

The reinforcement panels 272, 273, the cover 248, and the barrier panels 274, 275 are then sewn together on either side via stitching 296 to provide a pocket shaped to define the inflator retention portion 279. The inflator retention portion 279 is open at either end. Accordingly, the barrier 276, the cover 248, and the reinforcement panels 272, 273 may be bent to widen the inflator retention portion 279 along the transverse direction 62 to enable the inflator 42 to be inserted into the inflator retention portion 279 along the longitudinal direction 58. The diffuser 94 slides along the barrier 276 until it reaches the orifices 100.

When the diffuser 94 reaches the orifices 100, the orifices 100 slide around the diffuser 100 and the barrier 276 is able to move toward the main body 92, along the transverse direction 62 to bring the inflator retention portion 279 to the shape illustrated in FIG. 5. The orifices 100 then engage the recess 103 as described previously, thereby restricting withdrawal of the diffuser 94 form the orifices 100, and the inflator 42 is unable to move longitudinally in either direction.

The outer wall 264 and the cushion 240, including the reinforcement piece 282, have already been formed in previous steps. If needed, the attachment throat 270 and the inlet 280 may be folded together provide the pleat 281. As mentioned previously, the attachment throat 270 and the inlet 280 are formed from a single piece of fabric. The pleat 281 may be sewn via the stitching 296 to keep the pleat together 281 while additional assembly steps are undertaken.

Then, the first bracket 66, the cover 248, the reinforcement panels 272, 273, and the barrier 276 are all aligned with the pleat 281 in the arrangement illustrated in FIG. 5. The fasteners 284 are inserted through the corresponding holes formed in the first bracket 66, the pleat 281, the barrier 276, the reinforcement panels 272, 273, and the cover 248. However, the cover 248 is left open so that the second end 306 of the cover 248 is not anchored by the corresponding fasteners 284, but is left loose. The second bracket 68 may not be installed yet.

The cushion 240 is then compacted and packed into the space within the outer wall 264. As in previous embodiments, these two steps may be performed simultaneously via compression folding, or separately via ordered folding and subsequent insertion of the cushion 240 into the outer wall 264. By way of example, FIG. 5 illustrates the cushion 240 folded in an ordered and compact manner.

When the cushion 240 has been inserted into the outer wall 264, the cover 248 may be wrapped around the remainder of the airbag module 210, aside from the threaded studs 88 of the fasteners 284 and the second bracket 68, which has not yet been installed. The threaded studs 88 of the fasteners 284 that extend through the holes (not shown) of the first end 304 of the cover 248 are then inserted through the corresponding holes (not shown) of the second end 306, so that the cover 248 remains relatively tightly wrapped around the remainder of the airbag module 210. The threaded studs 88 are then inserted through the holes (not shown) of the second bracket 68 to complete the assembly. According to alternative methods, the second bracket 68 may be installed earlier to facilitate assembly of other components of the airbag module 210.

The airbag module 210 may then be installed in a mounting recess of an instrument panel (not shown) of a vehicle. Since the threaded studs 88 extend from proximate the inflator 42, and not from proximate the attachment throat 270, the threaded studs 88 may be secured to a rear panel (not shown) or other recessed structure within the instrument panel, rather than to an attachment lip near the exterior of the instrument panel. Wires such as the wires 50, 52 of FIG. 1 are coupled to the inflator 42. The cover 248 facilitates installation by keeping the cushion 240 firmly in place.

Operation of the airbag module 210 is similar to that of the airbag modules 10, 110 of the previous embodiments. The inflator 42 may be an adaptive inflator, and may thus contain multiple initiators (not shown). The inflator receives one or more activation signals and commences producing inflation gas, which exits the inflator 42 via the diffuser 94. The inflation gas thus flows directly into the cushion retention portion 278 and into the cushion 240. The cushion 240 begins to inflate, and presses against the interior surface of the cover 248. The cover 248 is placed under tension, and tears along the perforations 308. The two portions of the cover 248 are then able to open to permit inflation of the cushion 240 to provide impact protection.

The present invention may be embodied in other specific forms without departing from its structures, methods, or other essential characteristics as broadly described herein and claimed hereinafter. The described embodiments are to be considered in all respects only as illustrative, and not restrictive. The scope of the invention is, therefore, indicated by the appended claims, rather than by the foregoing description. All changes that come within the meaning and range of equivalency of the claims are to be embraced within their scope.

The invention claimed is:

1. An airbag module for protecting an occupant of a vehicle from impact, the airbag module comprising:
   a cushion that inflates from a compacted configuration to protect the occupant from impact; and
   a housing shaped to keep the cushion in the compacted configuration until inflation, wherein the housing is formed substantially of a fabric material, the housing comprising an attachment throat attachable to the vehicle;
   wherein the cushion is attached to the housing such that the inflation gas expels the cushion from the housing through the attachment throat and flows into the cushion to inflate the cushion.

2. The airbag module of claim 1, wherein the housing comprises a first bracket attached to the attachment throat and to an inlet of the cushion, wherein the first bracket comprises at least one attachment feature that facilitates attachment of the bracket to the vehicle.

3. The airbag module of claim 2, further comprising a second bracket, wherein adjacent portions of the attachment throat and the inlet are sandwiched between the first and second brackets.

4. The airbag module of claim 2, wherein the attachment throat is formed as a single piece with at least a portion of the cushion.

5. The airbag module of claim 4, wherein the attachment throat comprises a pleat attached to the first bracket.

6. The airbag module of claim 1, further comprising an inflator contained within the housing, wherein the inflator produces inflation gas in response to receipt of an activation signal.

7. The airbag module of claim 6, wherein the attachment throat is part of an outer wall of the housing, the housing comprising a barrier which is formed as a single piece with the outer wall, wherein the barrier is positioned between the inflator and the cushion in the compacted configuration to provide an inflator retention portion containing the inflator and a cushion retention portion containing the cushion in the compacted configuration.

8. The airbag module of claim 7, wherein the inflator comprises a diffuser extending through a first orifice of the barrier such that the diffuser is positioned generally within the cushion retention portion.

9. The airbag module of claim 8, wherein the diffuser extends from proximate a center of the inflator, along a direction generally perpendicular to an axis of the inflator.

10. The airbag module of claim 8, wherein the barrier is formed by first and second flaps extending from the outer wall, wherein the first orifice is formed in the first flap, wherein the first and second flaps are wrapped around the inflator along opposite directions, wherein the diffuser extends through a second orifice formed in the second flap.

11. The airbag module of claim 8, wherein the barrier is formed by a fabric wall extending between opposing sides of the outer wall, wherein the outer wall comprises first and second retention portions that extend around the inflator such that the inflator is retained between the barrier and the retention portions.

12. The airbag module of claim 1, wherein the attachment throat is attachable to an instrument panel of the vehicle such that the airbag module is suspended within the instrument panel.

13. The airbag module of claim 12, wherein the housing comprises at least one vent formed in the flexible material and positioned to vent gas into the instrument panel during inflation of the cushion.

14. An airbag module for protecting an occupant of a vehicle from impact, the airbag module comprising:
   an inflator that produces inflation gas in response to receipt of an activation signal;
   a cushion that receives the inflation gas and inflates from a compacted configuration to protect the occupant from impact; and
   a housing mountable within an instrument panel of the vehicle to contain the inflator and the cushion in the compacted configuration, wherein the housing is formed substantially of a fabric material, wherein the housing comprises an attachment throat attachable to the vehicle, and a first bracket attached to the attachment throat and to an inlet of the cushion, wherein the first bracket comprises at least one attachment feature that facilitates attachment of the bracket to the vehicle.

15. The airbag module of claim 14, further comprising a second bracket, wherein adjacent portions of the attachment throat and the inlet are sandwiched between the first and second brackets.

16. The airbag module of claim 14, wherein the attachment throat is formed as a single piece with at least a portion of the cushion.

17. The airbag module of claim 16, wherein the attachment throat comprises a pleat attached to the first bracket.

18. An airbag module for protecting an occupant of a vehicle from impact, the airbag module comprising:
   an inflator that produces inflation gas in response to receipt of an activation signal;
   a cushion that receives the inflation gas and inflates from a compacted configuration to protect the occupant from impact; and
   a housing mountable within an instrument panel of the vehicle to contain the inflator and the cushion in the compacted configuration, wherein the housing is formed substantially of a fabric material, wherein the housing comprises an outer wall and a barrier, which is formed as a single piece with the outer wall, wherein the barrier is positioned between the inflator and the cushion in the compacted configuration to provide an inflator retention portion containing the inflator and a cushion retention portion containing the cushion in the compacted configuration.

19. The airbag module of claim 18, wherein the inflator comprises a diffuser extending through a first orifice of the barrier such that the diffuser is positioned generally within the cushion retention portion.

20. The airbag module of claim 19, wherein the diffuser extends from proximate a center of the inflator, along a direction generally perpendicular to an axis of the inflator.

21. The airbag module of claim 19, wherein the barrier is formed by first and second flaps extending from the outer wall, wherein the first orifice is formed in the first flap, wherein the first and second flaps are wrapped around the inflator along opposite directions, wherein the diffuser extends through a second orifice formed in the second flap.

22. The airbag module of claim 19, wherein the barrier is formed by a fabric wall extending between opposing sides of the outer wall, wherein the outer wall comprises first and second retention portions that extend around the inflator such that the inflator is retained between the barrier and the retention portions.

23. An airbag module for protecting an occupant of a vehicle from impact, the airbag module comprising:
   an inflator that produces inflation gas in response to receipt of an activation signal;
   a cushion that receives the inflation gas and inflates from a compacted configuration to protect the occupant from impact; and
   a housing comprising an outer wall, at least a portion of which is formed as a single piece with at least a portion of the cushion, wherein the housing contains the inflator and keeps the cushion in the compacted configuration until inflation, wherein the housing is formed substantially of a fabric material, wherein the housing comprises an attachment throat attachable to the vehicle, and a first bracket attached to the attachment throat and to an inlet of the cushion, wherein the first bracket comprises at least one attachment feature that facilitates attachment of the bracket to the vehicle.

24. The airbag module of claim 23, wherein the attachment throat comprises a pleat attached to the first bracket.

25. An airbag module for protecting an occupant of a vehicle from impact, the airbag module comprising:
   an inflator that produces inflation gas in response to receipt of an activation signal;
   a cushion that receives the inflation gas and inflates from a compacted configuration to protect the occupant from impact; and
   a housing comprising an outer wall, at least a portion of which is formed as a single piece with at least a portion of the cushion, wherein the housing contains the inflator and keeps the cushion in the compacted configuration until inflation, wherein the housing is formed substantially of a fabric material, wherein the housing further comprises a barrier and an outer wall, wherein the barrier and the outer wall are formed as a single piece, wherein the barrier is positioned between the inflator and the cushion in the compacted configuration to provide an inflator retention portion containing the inflator and a cushion retention portion containing the cushion in the compacted configuration.

26. The airbag module of claim 25, wherein the inflator comprises a diffuser extending through a first orifice of the barrier such that the diffuser is positioned generally within the cushion retention portion.

27. The airbag module of claim 26, wherein the diffuser extends from proximate a center of the inflator, along a direction generally perpendicular to an axis of the inflator.

28. The airbag module of claim 26, wherein the barrier is formed by first and second flaps extending from the outer wall, wherein the first orifice is formed in the first flap, wherein the first and second flaps are wrapped around the inflator along opposite directions, wherein the diffuser extends through a second orifice formed in the second flap.

29. The airbag module of claim 26, wherein the barrier is formed by a fabric wall extending between opposing sides of the outer wall, wherein the outer wall comprises first and second retention portions that extend around the inflator such that the inflator is retained between the barrier and the retention portions.

30. A method for protecting an occupant of a vehicle from impact through the use of an airbag module comprising an inflator, a cushion, and a housing having an attachment throat, the method comprising:

transmitting an activation signal to the inflator to trigger egress of inflation gas from the inflator;

conducting the inflation gas through the housing to expel the cushion from the housing through the attachment throat, wherein the attachment throat is attached to the vehicle and the housing is formed substantially of a fabric material; and conducting the inflation gas into the cushion from the housing via the attachment throat to inflate the cushion.

31. The method of claim 30, wherein the attachment throat is part of an outer wall, the housing comprising a barrier, wherein the barrier and the outer wall are formed as a single piece, wherein the barrier is positioned between the inflator and the cushion in the compacted configuration to provide an inflator retention portion containing the inflator and a cushion retention portion containing the cushion in the compacted configuration, wherein conducting the inflation gas through the housing comprises moving the inflation gas across the barrier, from the inflator retention portion to the cushion retention portion.

32. The method of claim 31, wherein the inflator comprises a diffuser extending through a first orifice of the barrier such that the diffuser is positioned generally within the cushion retention portion, wherein moving the inflation gas across the barrier comprises moving the inflation gas through the first orifice and into the diffuser.

33. The method of claim 32, wherein the diffuser extends from proximate a center of the inflator, along a direction generally perpendicular to an axis of the inflator, wherein moving the inflation gas through the first orifice and into the diffuser comprises moving the inflation gas generally perpendicular to the axis.

34. The method of claim 32, wherein the barrier is formed by first and second flaps extending from the outer wall, wherein the first orifice is formed in the first flap, wherein the first and second flaps are wrapped around the inflator along opposite directions, wherein the diffuser extends through a second orifice formed in the second flap, the method further comprising moving the inflation gas through the second orifice.

35. The method of claim 32, wherein the barrier is formed by a fabric wall extending between opposing sides of the outer wall, wherein the outer wall comprises first and second retention portions that extend around the inflator such that the inflator is retained between the barrier and the retention portions, wherein moving the inflation gas through the barrier comprises moving the inflation gas through the fabric wall.

36. The method of claim 32, wherein the attachment throat is attachable to an instrument panel of the vehicle such that the airbag module is suspended within the instrument panel, wherein expelling the cushion from the housing comprises expelling the cushion from the instrument panel.

37. The method of claim 36, wherein the housing comprises at least one vent formed in the flexible material, the method further comprising venting inflation gas into the instrument panel through the vent.

38. A method for manufacturing an airbag module for protecting an occupant of a vehicle from impact, the airbag module comprising a cushion, an inflator having a diffuser, and a housing having a cushion retention portion and a first orifice adjacent to the cushion retention portion, wherein the housing comprises an outer wall and a barrier, wherein the barrier and the outer wall are formed as a single piece, the first orifice being formed in the barrier, wherein the barrier provides the cushion retention portion and an inflator retention portion, the method further comprising inserting the inflator into the inflator retention portion by disposing the inflator to rest against the barrier, the method comprising:

inserting the diffuser through the first orifice such the diffuser is positioned substantially within the cushion retention portion;

wrapping a portion of the housing at least partially around the inflator to retain the inflator; and inserting the cushion into the cushion retention portion.

39. The method of claim 38, wherein the housing further comprises first and second flaps extending from the outer wall, wherein the first orifice is formed in the first flap, the method further comprising inserting the diffuser through the second orifice, wherein wrapping a portion of the housing at least partially around the inflator comprises wrapping the first and second flaps around the inflator along opposite directions.

40. The method of claim 38, wherein the barrier is formed by a fabric wall extending between opposing sides of the outer wall, wherein the outer wall comprises first and second retention portions, wherein inserting the inflator into the inflator retention portion comprises moving the inflator between the first and second retention portions, wherein wrapping a portion of the cushion at least partially around the inflator comprises positioning the first and second retention portions to extend around the inflator such that the inflator is retained between the barrier and the retention portions.

41. The method of claim 38, wherein the inflator comprises a main body, wherein the diffuser extends from proximate a center of the main body, along a direction generally perpendicular to an axis of the main body, wherein disposing the inflator to rest against the barrier comprises disposing the main body to rest against the barrier.

42. The method of claim 38, wherein the inflator comprises a recess positioned proximate the diffuser, wherein inserting the diffuser through the first orifice comprises engaging the recess with the first orifice to restrict withdrawal of the diffuser from the first orifice.

43. The method of claim 38, wherein inserting the cushion into the cushion retention portion comprises folding the cushion along an established fold pattern.

44. The method of claim 38, wherein inserting the cushion into the cushion retention portion comprises compacting the cushion substantially independent of any established fold pattern.

* * * * *